June 6, 1967  R. W. CARLSON  3,323,796
JOUSTING APPARATUS
Filed Nov. 16, 1964

INVENTOR.
ROY W. CARLSON
BY
Smith & Mattern
ATTORNEYS

United States Patent Office 3,323,796
Patented June 6, 1967

3,323,796
JOUSTING APPARATUS
Roy W. Carlson, 809 NW. 73rd Ave.,
Seattle, Wash. 98107
Filed Nov. 16, 1964, Ser. No. 411,539
1 Claim. (Cl. 273—1)

This invention relates to recreational equipment and, more particularly, to jousting apparatus to be used in a modern version of a sport originating in historical times in combats between knights on horseback armed with lances or jousting sticks.

The purpose of the invention is to provide durable apparatus to be used by two persons anywhere to exercise themselves in a contest of astute utilization of their physical powers.

The invention, briefly described, comprises two hand holdable sticks, each to be gripped by a contestant, and a flexible, comparatively short, well anchored member connecting the jousting ends of the sticks.

Figure 1:
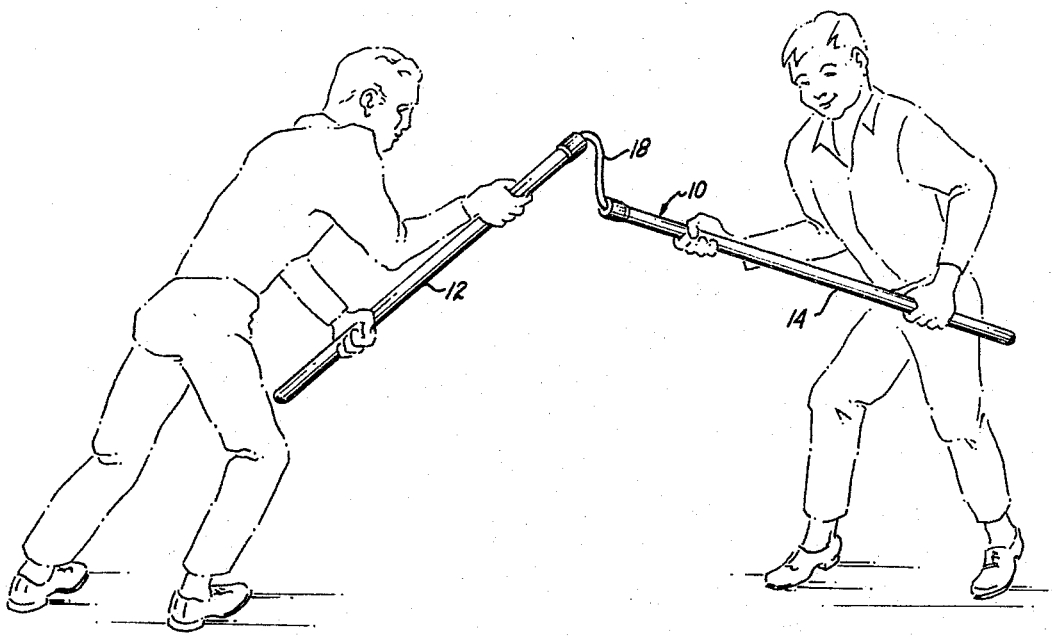
Figure 2:
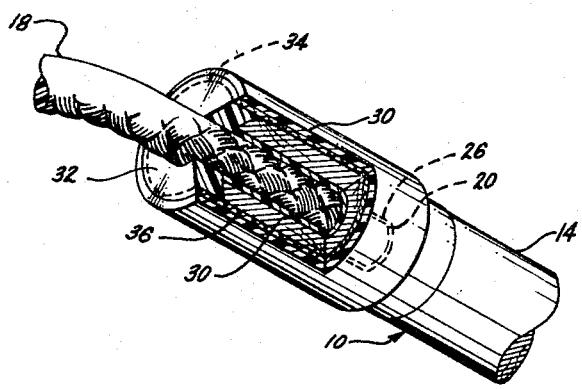

A preferred embodiment of the invention is illustrated in the accompanying drawing, wherein:

FIGURE 1 is a perspective view of the jousting apparatus with dotted lines indicating participants; and FIGURE 2 is an enlarged partial view, with portions removed to indicate the anchoring structures holding the flexible member in place between the jousting ends of the jousting apparatus.

In this illustrated preferred embodiment of the jousting apparatus 10 each stick 12, 14 is preferably of a length which will be waist high or near thereto of the participants, shorter length sticks being provided for children. The sticks are made preferably from wood stock but strong aluminum alloy tubing or the like might be used. The exterior is preferably round to accommodate hand gripping but other cross-sectional shapes, such as hexagonal, could be formed.

The connecting member or connector 18 is preferably rope-like in its appearance and characteristics, and may be made of both natural and man-made materials, an example of the latter being braided polypropylene. Its free length is restrictive, preferably being about one-seventh the length of a stick. Its anchored ends 20 in the illustrated embodiment, project into centered longitudinal recesses 26 in each stick 12, 14, which are about two inches in depth and of an oversize diameter to accommodate securing materials. Such recessed securing end structure is deemed preferable to avoid hooks and eyelets which could harm a contestant.

The connector ends 20 are anchored within the recesses 26 by a securing material, such as an epoxy resin 30, which fills the oversize diameter clearance volume around the connector ends 20. To enhance the securing material's holding power and appearance, such epoxy resin 30 is spread on the jousting end of the stick on the surface area remaining around the connector 18.

To increase the depth of such end coating 32 and to increase the continuity of the epoxy resin materials over a greater attaching stick surface area, a ferrule is placed around the jousting stick end by each inserted connector end 20 and positioned to extend beyond the stick end thereby providing an annular ring cavity 34 which receives the bonding epoxy resin. The ferrule could be made of a light gauge metal but preferably is constructed of fiberglass wrappings 36, embedded in a polyester resin. Subsequently, the epoxy resin is overlaid on the ferrule when each connector end 20 is so secured to complete what appears as an end dipping of epoxy resin excluding the movable portions of the connector 18.

As so constructed of wood, braided polypropylene, epoxy resin and wraps of fiberglass embedded in polyester resin or equivalent materials, this jousting apparatus is ready for long and rugged use in about the safest apparatus environment possible to simulate the jousting sport of the knights of old times.

I claim:

A jousting apparatus comprising two sticks joined together with a universally flexible rope-like connecting member well anchored within the respective stick ends and having the portion intermediate its anchored ends which is long enough to allow multiple angular, lineal and rotative relative motions of the respective anchoring stick ends, wherein said flexible rope-like connecting member portion is about five stick diameters in length and the overall stick length is about thirty-eight stick diameters in length, said stick length approaching a jousting participant's waist height.

References Cited

UNITED STATES PATENTS

| 1,462,088 | 7/1923 | La Sares | 272—75 |
| 3,140,094 | 7/1964 | Hinges. | |

FOREIGN PATENTS

| 832,726 | 10/1938 | France. |
| 331,994 | 1/1921 | Germany. |
| 667 | 2/1889 | Great Britain. |

RICHARD C. PINKHAM, Primary Examiner.

F. B. SHAY, S. NATTER, Assistant Examiners.